Patented Aug. 22, 1950

2,519,651

UNITED STATES PATENT OFFICE 2,519,651

POLYAZO DYESTUFFS

Walter Hanhart, Riehen, Switzerland, assignor to Ciba Limited, Basel, Switzerland, a Swiss firm No Drawing. Application July 11, 1946, Serial No. 682,931. In Switzerland July 26, 1945

7 Claims. (Cl. 260—167)

According to this invention valuable polyazo-dyestuffs are made by treating aminoazo-dyestuffs with phosgene, and using at least one aminoazo-dyestuff of the following formula:

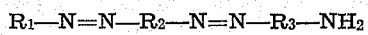
$R_1—N=N—R_2—N=N—R_3—NH_2$ in which $R_1$ represents the radical of a hydroxybenzene-orthocarboxylic acid free from sulfonic acid groups, $R_2$ a radical of the benzene series containing a sulfonic acid group, and $R_3—NH_2$ the radical of an amine of the benzene series capable of coupling a para-position with respect to the amino group.

British Patent No. 491,019 describes a process for the manufacture of tetrakisazo-dyestuffs wherein aminodisazo-dyestuffs of the general formula

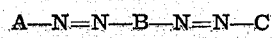
$A—N=N—B—N=N—C$ (in which A is the radical of a salicylic acid or a derivative thereof, B is the residue of an aromatic middle component and C is the radical of an aromatic amine compound coupled in para-position to the amino group) are treated with phosgene, the initial materials being so selected that the final tetrakisazo-dyestuff contains at least two sulfonic acid groups. The preparation of the azo-dyestuffs may be effected, for example, by diazotizing an amino-salicylic acid and coupling with an amino compound capable of coupling. This process is of no use in the preparation of diazo-dyestuffs which are to be subjected to a treatment with phosgene and which have as middle component (B) a sulfonic acid of the benzene series because disazo-dyestuffs of this kind cannot be produced by the process described in the British patent. The polyazo-dyestuffs of the present specification, which are made from disazo-dyestuffs having as middle component a sulfonic acid of the benzene series, have properties, for example, purer tints of the dyeings, which make them superior to the disazo-dyestuffs of the aforementioned British patent whose middle component is a member of the benzene series which is free from any sulfonic acid group.

The amino-disazo-dyestuffs of the above general formula

$R_1—N=N—R_2—N=N—R_3—NH_2$ which are to be subjected to treatment with phosgene, may be prepared in the following manner: A diazotized 1-amino-4-nitrobenzene sulfonic acid or a diazotized monoacyl-para-phenylenediamine sulfonic acid is coupled in an alkaline medium with a 1-hydroxy-benzene-2-carboxylic acid. Coupling can be brought about in an alkaline medium, preferably one alkaline with sodium carbonate. As 1-amino-4-nitrobenzene sulfonic acids there come into consideration 1-amino-4-nitrobenzene-2-sulfonic acid and 1-amino-4-nitrobenzene-3-sulfonic acid. As monoacyl-para-phenylenediamine sulfonic acids there may be used compounds corresponding to the aforesaid nitro-compounds and containing, instead of the nitro-group, an acylamino group. The coupling components may consist of 1-hydroxybenzene-2-carboxylic acid itself or substitution products thereof which are capable of coupling, such as 1-hydroxybenzene-6-methyl-2-carboxylic acid. In the resulting monoazo-dyestuff either the nitro group is reduced or the acylamino group is hydrolyzed, depending on the starting material used. An appropriate means for reducing the nitro group to form the amino group is an alkali sulfide, for example, sodium sulfide. Hydrolysis of the acylamino group may be brought about by treatment with dilute caustic alkalis at a raised temperature, for instance by boiling with dilute caustic soda solution. The aminoazo-dyestuff so formed is diazotized and coupled in an acid medium with an amine of the benzene series capable of coupling in para-position with respect to the amino group, for example, 1-amino-2-methoxy-5-methylbenzene, 1-amino-3-methylbenzene, 1-amino-2:5-dimethoxybenzene, 1-amino-3-methoxybenzene or aniline, advantageously coupling the latter compound in the form of aniline-ω-methane-sulfonic acid, and subsequently splitting off the ω-methane-sulfonic acid group.

The treatment with phosgene may be carried out in known manner, for example, in an aqueous medium which is maintained alkaline in reaction. Instead of symmetrical dyestuffs asymmetrical dyestuffs may be made by using a mixture of different aminoazo-dyestuffs of which at least one must be of the above defined general formula.

The dyestuffs obtained by the process of the invention are suitable for dyeing and printing a wide variety of fibers, such as wool, silk and leather, artificial fibers of animal materials or superpolyamides, but more especially for dyeing and printing cellulose fibers such as cotton, linen, ramie, hemp and also artificial silk or staple fibers of regenerated cellulose. Especially valuable products are obtained by treating the dyestuffs of the invention in substance, or in the dyebath or especially on the fiber with an agent yielding metal, advantageously an agent yielding copper. This treatment can be carried out by the usual methods.

Especially valuable results are obtained in many cases by the dyeing process described in Patent No. 2,148,659, in which the material is dyed and after-treated, for example, with an agent yielding copper, in one and the same bath. For this purpose there are advantageously used agents yielding copper which are stable towards dilute alkalis, for example, complex alkali copper tartrates and the like (see Patent No. 2,185,905). The treatment with an agent yielding metal may be carried out partly in substance and partly on the fiber (see British Patent No. 516,076).

The dyestuffs of the invention yield, when after-coppered, mainly red dyeings of good fastness, especially to washing and light.

The following examples illustrate the invention, the parts being by weight unless otherwise stated and the relationship of parts by weight to parts by volume being the same as that of the kilogram to the liter:

*Example 1*

33.7 parts of 4-amino-4'-hydroxy-3'-carboxy-1:1'-azobenzene-2-sulfonic acid, which has been

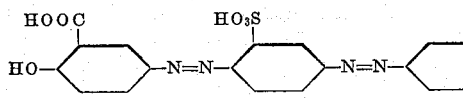

obtained by coupling, in a medium which is maintained alkaline with sodium carbonate, diazotized 1-amino-4-nitrobenzene-2-sulfonic acid with salicylic acid and reduction of the nitro-azo-dyestuff thus obtained with sodium sulfide, are dissolved in 500 parts of warm water with the addition of sufficient caustic soda solution to bring about neutralization, and mixed with 7 parts of sodium nitrite. The resulting solution is introduced, while thoroughly stirring, into a mixture of ice and 46 parts of hydrochloric acid of 30 per cent. strength, and the whole is stirred for several hours. The resulting product is then coupled with a solution in hydrochloric acid of 14 parts of 1-amino-2-methoxy-5-methylbenzene, and neutralized with sodium acetate. The mineral acid liberated during the coupling is neutralized with sodium acetate. When the coupling is complete the suspension is acidulated with mineral acid and then filtered, whereupon the dyestuff is converted into its sodium salt. The latter is dissolved in 5000 parts of water, and treated with phosgene at 40–50° C. with the addition of sodium carbonate until unchanged dyestuff can no longer be detected. The precipitated and dried tetrakisazo-dyestuff of the formula

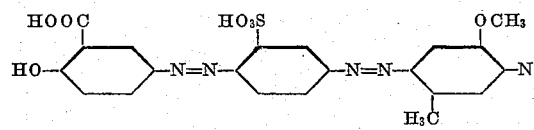

is a red-brown powder, which dissolves in concentrated sulfuric acid with a blue coloration and in water with a red coloration. It dyes cotton by the 1- or 2-bath after-coppering process fast red tints.

A similar dyestuff is obtained by starting from 4 - amino - 4'- hydroxy - 3'- carboxy - 1:1'- azo-benzene-3-sulfonic acid.

*Example 2*

33.7 parts of 4-amino-4'-hydroxy-3'-carboxy-azobenzene-2-sulfonic acid in the form of its sodium salt are dissolved in 500 parts of warm water and after the addition of 7 parts of sodium nitrite poured into a mixture of ice and 46 parts of hydrochloric acid of 30 per cent. strength. After stirring for several hours, the mineral acid is neutralized by the addition of sodium acetate, followed by coupling with a solution of 9.7 parts of aminobenzene containing sodium acetate, which aminobenzene has first been converted in the usual manner into the ω-methane sulfonic acid by means of formaldehyde and bisulfite. When coupling is complete, the ω-methane-sulfonic acid group is split off by heating with dilute hydrochloric acid. The aminodisazo-dyestuff which has precipitated is filtered off, then dissolved in 5000 parts of water to which sodium carbonate is added and treated with phosgene at 40–50° C. until the amino compound can no longer be detected. The solution must always give a slightly alkaline reaction. After cooling the precipitated dyestuff of the formula

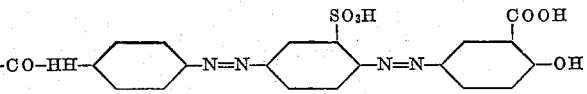

is filtered and dried. The brown dyestuff powder thus obtained dissolves in concentrated sulfuric acid to give a blue, in water to give an orange-brown coloration and dyes vegetable fibers in single or double bath after-coppering processes orange-red tints, which are fast to washing.

*Example 3*

33.7 parts of 4-amino-4'-hydroxy-3'-carboxy-azobenzene-2-sulfonic acid in the form of its sodium salt are dissolved in 500 parts of warm water and after the addition of 7 parts of sodium nitrite poured into a mixture of ice and 46 parts of hydrochloric acid of 30 per cent. strength. The whole is stirred for several hours with cooling and then coupled with a hydrochloric acid solution of 12.9 parts of 1-amino-3-methoxy-benzene, the mineral acid being neutralized by the addition of sodium acetate. When coupling is complete, the amino-disazo-dyestuff is separated, then, in the form of its sodium salt, dissolved in 5000 parts of water and then treated with phosgene at a temperature of 40–50° C. until the amino compound can no longer be detected. The solution must always give a slightly alkaline reaction. The precipitated dyestuff of the formula

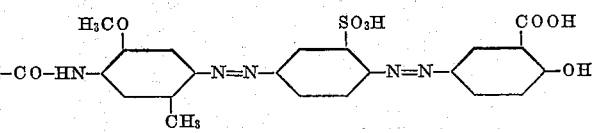

is filtered and dried. The brown dyestuff-powder thus obtained dissolves in concentrated sulfuric acid to give a blue, in water to give a brown-red coloration, and dyes vegetable fibers in single or double bath after-coppering processes red tints which are very fast to washing.

*Example 4*

35.1 parts of 4-amino-3'-methyl-4'-hydroxy-5'-carboxy-azobenzene-2-sulfonic acid in the form of its sodium salt are dissolved in 500 parts of warm water and after the addition of 7 parts of sodium nitrite are poured into a mixture of ice and 46 parts of hydrochloric acid of 30 per cent. strength. After stirring and cooling for several hours, the whole is combined with a hydrochloric acid solution of 14.4 parts of 1-amino-2-methoxy-5-methylbenzene. The mineral acid is neutralized with sodium acetate. The aminodisazo-dyestuff is separated when coupling is complete and is then dissolved in the form of its sodium salt in 5000 parts of water and converted into the urea in the usual manner by treatment with phosgene in slightly alkaline solution. The filtered and dried dyestuff of the formula

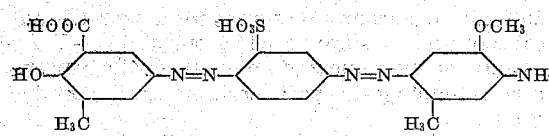

is a brown powder dissolving in concentrated sulfuric acid to give a blue, in water to give a brown-red coloration and dyeing vegetable fibers in single or double bath after-coppering processes fast bluish red tints.

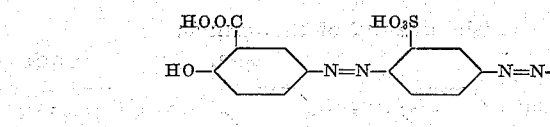

*Example 5*

5.3 parts of the sodium salt of the aminodisazo-dyestuff of the formula

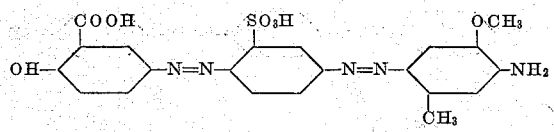

described in Example 1, and 5 parts of the sodium salt of the aminodisazo-dyestuff of the formula

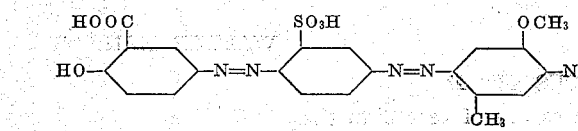

which is obtainable in the same manner, are dissolved in 1000 parts of water and treated in slightly alkaline solution at 40–50° C. with phosgene until it is no longer possible to detect any unchanged amino compound. The precipitated dyestuff consisting mainly of the compound of the formula

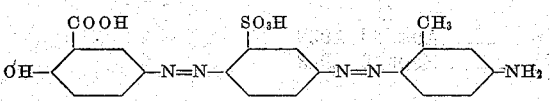

is filtered and dried. The brown dyestuff-powder thus obtained dissolves in concentrated sulfuric acid to give a blue, in water to give a brown-red coloration and dyes vegetable fibers in single or double bath after-coppering processes fast red tints.

*Example 6*

5.3 parts of sodium salt of the aminodisazo-dyestuff of the formula

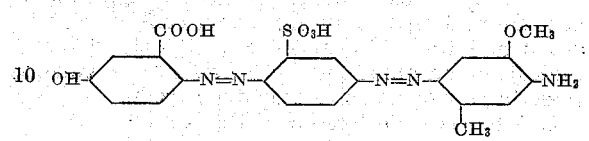

described in Example 1 and 2.8 parts of the sodium salt of 4'-hydroxy-3'-carboxy-4-amino-

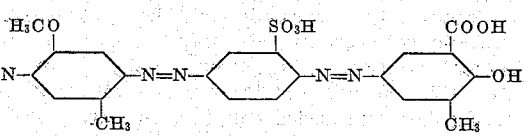

azobenzene are dissolved in 1000 parts of water and treated in slightly alkaline solution at about 40° C. with phosgene until the amino groups have disappeared. The filtered and dried dyestuff consisting mainly of the compound of the formula

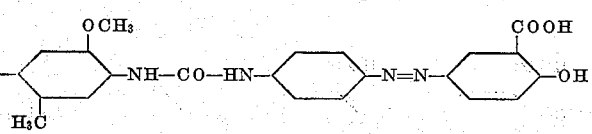

is a drak powder which dissolves in concentrated sulfuric acid to give a greenish blue, in water to give an orange-blue solution and which dyes vegetable fibers in single or double bath after-coppering processes yellowish red tints very fast to washing.

*Example 7*

0.1 part of the dyestuff obtained as described in Example 1 and having the formula

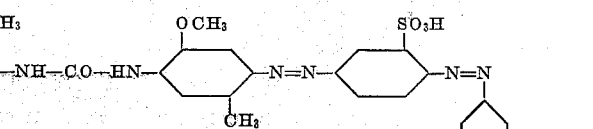

(in the form of its sodium salt) is dissolved in 200 parts of water with the addition of 0.2 part of sodium carbonate. 10 parts of cotton are entered at 30–40° C., the bath is brought to the boil, 3 parts of Glauber salt are added, and dyeing is carried on at 90–95° C. for ¾ hour. There are then added to the bath 10 parts by volume of a solution prepared by dissolving 10 parts of crystalline copper sulfate, 12 parts of tartaric acid and the quantity of caustic soda solution required for neutralization in 1000 parts of water. Dyeing is continued for about ½ hour longer at 90–95° C., the material is then rinsed in cold water, and

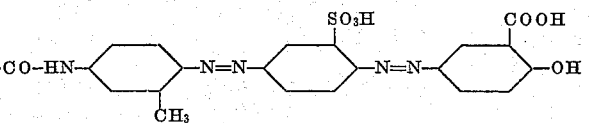

soaped at 50–75° C. in a bath containing, per liter, 5 grams of soap and 2 grams of sodium carbonate. A red dyeing is obtained which is fast to washing and light.

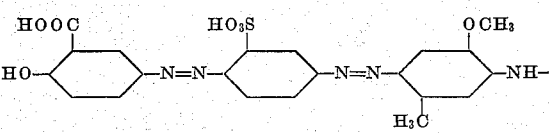

What I claim is:

1. A tetrakisazo-dyestuff of the formula

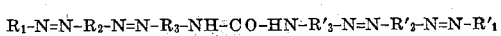

wherein $R_1$ and $R'_1$ stand for radicals of a hydroxybenzene-ortho-carboxylic acid being free from sulfonic acid groups, $R_2$ and $R'_2$ stand for benzene radicals containing each a sulfonic acid group and $R_3$—NH— and —HN—$R'_3$ stand for radicals of an amine of the benzene series coupling in para-position to the amino group.

2. A tetrakisazo-dyestuff of the formula

wherein $R_1$ stands for the radical of a hydroxybenzene-ortho-carboxylic acid being free from sulfonic acid groups, $R_2$ stands for a benzene radical containing a sulfonic acid group and $R_3$—NH— stands for the radical of an amine of the benzene series coupling in para-position to the amino group.

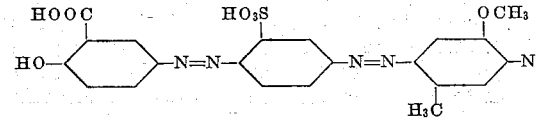

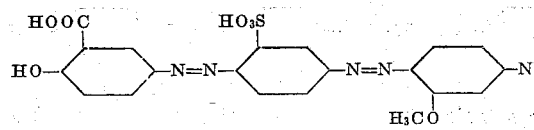

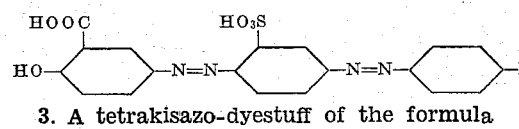

3. A tetrakisazo-dyestuff of the formula

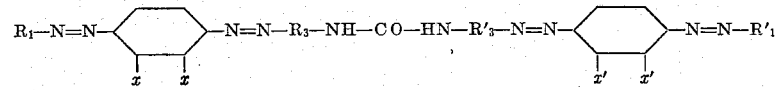

wherein $R_1$ and $R'_1$ stand for radicals of a hydroxybenzene-ortho-carboxylic acid being free from sulfonic acid groups, one $x$ and one $x'$ stand for hydrogen, the other $x$ and the other $x'$ stand for sulfonic acid groups and $R_3$—NH— and —HN—$R'_3$ stand for radicals of an amine of the benzene series coupling in para-position to the amino group.

4. A tetrakisazo-dyestuff of the formula

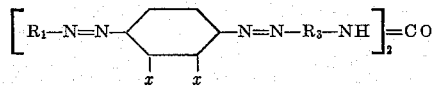

wherein $R_1$ stands for the radical of a hydroxybenzene-otho-carboxylic acid being free from sulfonic acid groups, $R_2$ stands for a benzene radical containing a sulfonic acid group and $R_3$—NH— stands for the radical of an amine of the benzene series coupling in para-position to the amino group.

5. The tetrakisazo-dyestuff of the formula

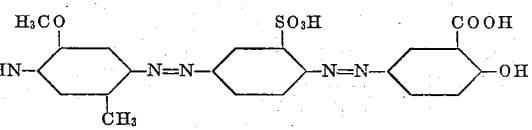

6. The dyestuff of the formula

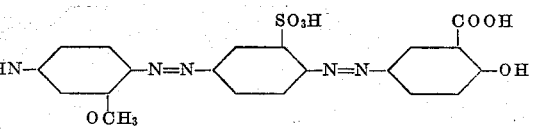

7. The dyestuff of the formula

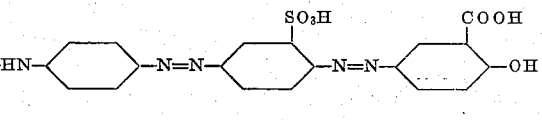

WALTER HANHART.

REFERENCES CITED

The following references are of record in the file of this patent:

UNITED STATES PATENTS

| Number | Name | Date |
|---|---|---|
| 1,573,605 | Gunther | Feb. 16, 1926 |

FOREIGN PATENTS

| Number | Country | Date |
|---|---|---|
| 491,019 | Great Britain | Aug. 24, 1938 |
| 555,791 | Great Britain | Sept. 8, 1943 |

Certificate of Correction

Patent No. 2,519,651 August 22, 1950

WALTER HANHART

It is hereby certified that error appears in the printed specification of the above numbered patent requiring correction as follows:

Column 1, line 12, for "a" read *in*; column 5, line 12, for "soduim" read *sodium*; column 6, line 33, for "drak" read *dark*; column 8, line 15, for "-otho-" read *-ortho-*; lines 16 and 17, for "$R_2$ stands for a benzene radical containing" read *one x stands for hydrogen and the other x stands for*;

and that the said Letters Patent should be read as corrected above, so that the same may conform to the record of the case in the Patent Office.

Signed and sealed this 7th day of November, A. D. 1950.

[SEAL]

THOMAS F. MURPHY,
*Assistant Commissioner of Patents.*